US006564221B1

(12) United States Patent
Shatdal

(10) Patent No.: US 6,564,221 B1
(45) Date of Patent: May 13, 2003

(54) RANDOM SAMPLING OF ROWS IN A PARALLEL PROCESSING DATABASE SYSTEM

(75) Inventor: Ambuj Shatdal, Madison, WI (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/457,274

(22) Filed: Dec. 8, 1999

(51) Int. Cl.[7] ............................ G06F 7/00; G06F 17/00; G06F 17/30
(52) U.S. Cl. ........................ 707/102; 707/1; 707/10; 707/101
(58) Field of Search ........................ 707/100, 102, 707/1, 10, 101

(56) References Cited

U.S. PATENT DOCUMENTS 5,878,426 A * 3/1999 Plasek et al. ............... 707/102
6,003,036 A * 12/1999 Martin ....................... 707/102
6,223,171 B1 * 4/2001 Chaudhuri et al. ............ 707/2

* cited by examiner

Primary Examiner—Safet Metjahic
Assistant Examiner—Cindy Nguyen
(74) Attorney, Agent, or Firm—Gates & Cooper

(57) ABSTRACT

A method, apparatus, and article of manufacture for random sampling of rows stored in a table, wherein the table has a plurality of partitions. A row count is determined for each of the partitions of the table and a total number of rows in the table is determined from the row count for each of the partitions of the table. A proportional allocation of a sample size is computed for each of the partitions based on the row count and the total number of rows. A sample set of rows of the sample size is retrieved from the table, wherein each of the partitions of the table contributes its proportional allocation of rows to the sample set of rows. Preferably, the computer system is a parallel processing database system, wherein each of its processing units manages a partition of the table, and some of the above steps can be performed in parallel by the processing units.

66 Claims, 2 Drawing Sheets

RANDOM SAMPLING OF ROWS IN A PARALLEL PROCESSING DATABASE SYSTEM

BACKGROUND OF THE INVENTION

1. Field of the Invention

This invention relates in general to database management systems performed by computers, and in particular, to random sampling of rows in a parallel processing database system.

2. Description of Related Art

Relational Data Base Management Systems (RDBMS) are well known in the art. In an RDBMS, all data is externally structured into tables. A table is a two dimensional entity, consisting of rows and columns. Each column has a name, typically describing the type of data held in that column. As new data is added, more rows are inserted into the table.

Structured Query Language (SQL) statements allow users to formulate relational operations on the tables. One of the most common SQL statements executed by an RDBMS is to generate a result set from one or more combinations of one or more tables (e.g., through joins) and other functions.

One problem in using an RDBMS is that of obtaining one or more mutually exclusive random samples of rows from a table partitioned across multiple processing units of a parallel processing database system. In many occasions in the data processing environment, one may not want to look at or process the whole table of rows. This is because analyzing random samples of data can provide insight into the properties of the entire data without requiring the analysis of the entire data. In such cases, it is extremely useful to be able to obtain one or more (mutually exclusive) random samples of the rows to look at or to process.

For example, instead of computing an average of the whole set, one may be satisfied with an average of the random sample of the rows in the table that may be obtained more quickly. One may also want different samples to train, test and validate a neural network analysis. However, an application would have to fetch the entire data from the database system or at best fetch a non-random sample by limiting the data in some non-random way, e.g., by just looking at first N rows and ignoring the rest. These are not satisfactory alternatives.

Thus, there is a need in the art for improved random sampling of rows stored on a database system.

SUMMARY OF THE INVENTION

The present invention discloses a method, apparatus, and article of manufacture for random sampling of rows stored in a table, wherein the table has a plurality of partitions. A row count is determined for each of the partitions of the table and a total number of rows in the table is determined from the row count for each of the partitions of the table. A proportional allocation of a sample size is computed for each of the partitions based on the row count and the total number of rows. A sample set of rows of the sample size is retrieved from the table, wherein each of the partitions of the table contributes its proportional allocation of rows to the sample set of rows. Preferably, the computer system is a parallel processing database system, wherein each of its processing units manages a partition of the table, and some of the above steps can be performed in parallel by the processing units.

An object of the present invention is to incorporate sampling in a parallel processing database system.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The preferred embodiment of the present invention describes a method for obtaining one or more mutually exclusive random samples of rows from a partitioned table managed by multiple processing units of a parallel processing database system One advantage of this approach is that the entire table need not be randomly re-ordered, and partitions of the table can be processed independently. Another advantage is that most of the processing takes place independently on multiple processing units, so that the method scalable to any number of processing units.

Furthermore, fetching the random samples can be closely integrated with the rest of the database processing. In fact, the sampling request can be made using an extension of SQL (Structured Query Language) and can also be used as a table expression where the samples can be further analyzed in the same request.

Environment

Figure 1:
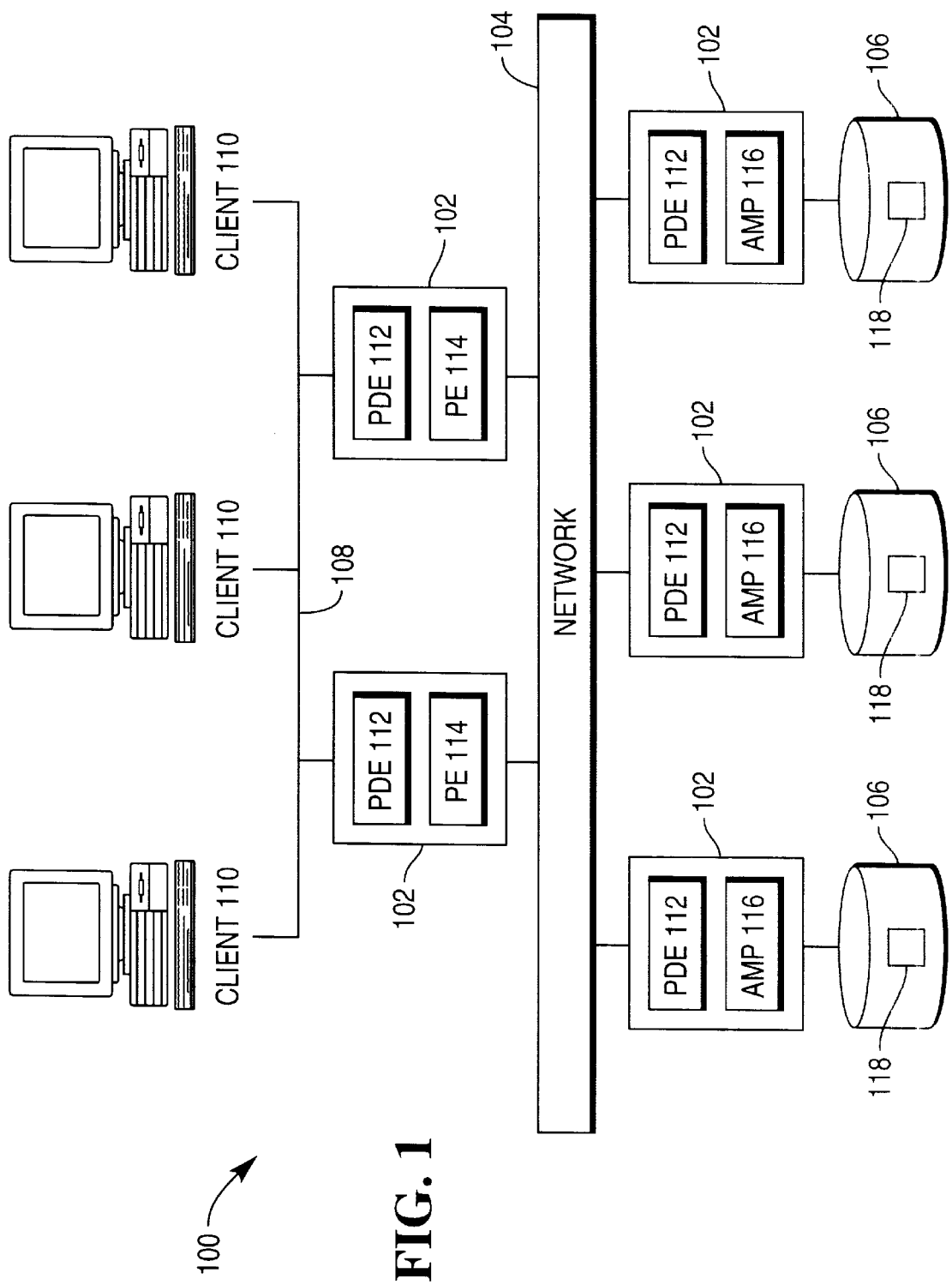
FIG. 1 illustrates an exemplary software and hardware environment that could be used with the present invention.

FIG. 1 illustrates an exemplary hardware and software environment that could be used with the present invention. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 generally use a workstation 110, terminal, computer, or other input device to interact with the computer system 100. This interaction generally comprises queries that conform to the Structured Query Language (SQL) standard, and invoke functions performed by Relational DataBase Management System (RDBMS) software executed by the system 100.

In the preferred embodiment of the present invention, the RDBMS software comprises the Teradata® product offered by NCR Corporation, and includes one or more Parallel Database Extensions (PDEs) 112, Parsing Engines (PEs) 114, and Access Module Processors (AMPs) 116. These components of the RDBMS software perform the functions necessary to implement the RDBMS and SQL standards, i.e., definition, compilation, interpretation, optimization, database access control, database retrieval, and database update.

Work is divided among the PUs 102 in the system 100 by spreading the storage of a partitioned relational database 118 managed by the RDBMS software across all of the AMPs 116 and the DSUs 106 (which are managed by the AMPs 116). Thus, each DSU 106 may store only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, optimization and query plan generation and control. The PEs 114 fully parallelize all functions among the AMPs 116. As a result, the system of FIG. 1 applies a multiple instruction stream, multiple data stream (MIND) concurrent processing architecture to implement a relational database management system 100.

Both the PEs 114 and AMPs 116 are known as "virtual processors" or "vprocs". The vproc concept is accomplished by executing multiple threads or processes in a PU 102, wherein each thread or process is encapsulated within a vproc. The vproc concept adds a level of abstraction between the multi-threading of a work unit and the physical layout of the parallel processor computer system 100. Moreover, when a PU 102 itself is comprised of a plurality of processors or nodes, the vproc provides for intra-node as well as the inter-node parallelism.

The vproc concept results in better system 100 availability without undue programming overhead. The vprocs also provide a degree of location transparency, in that vprocs with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide a SQL query into smaller sub-queries, each of which can be assigned to an AMP 116. In the preferred embodiment, a hashing function assigns data rows to AMPs 116. The columns or fields comprising the primary index of the rows are typically put through a modulo prime number hashing function, which results in a hash "bucket" number. A hash map provides the mapping of hash buckets to AMPs 116.

There are generally a large number of hash bucket numbers, and each AMP 116 may be assigned several bucket numbers for both prime and fallback hash maps. This makes it possible to evenly divide the data storage, and hence the processing load, among the AMPs 116 in the system 100.

When additional AMPs 116 are configured into a system 100, the new AMPs 116 are populated by re-mapping some hash buckets from the existing AMPs 116 to the new AMPs 116, and then moving the rows corresponding to the re-mapped hash buckets to the DSUs 106 managed by the new AMPs 116. Thus, only the minimum amount of data necessary is moved during a reconfiguration of the system 100.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when read and executed by the PUs 102 of the computer system 100, causes the computer system 100 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention. In addition, it should be understood that the present invention may also apply to computer programs other than those disclosed herein.

Operation of the Parallel Sampling Method

The preferred embodiment of the present invention includes both a parallel sampling method and an identification of mutually exclusive rows belonging to the samples. Because the sampling method is random, any sample of the data is equally likely to be selected. In this method, however, a stratified random sampling method is used by pre-determining the number of sample rows to be obtained at each PU 102. This method still preserves most of the randomness properties as the pre-allocation does not examine the data itself. Moreover, because the rows are mutually exclusive, a row belonging to one sample can not belong to any other sample, i.e., the sampling is done without replacement.

The input to the method is a table of rows that is partitioned 118 across the PUs 102 of the computer system 100. Each partition 118 of the table is stored as a B+ Tree indexed file on the DSU 106. Among other things, an index may contain the information of how many rows are in each of the partitions 118. In one embodiment, the index is scanned to collect row counts for the partition 118. In other embodiments where there no such index is available or where no such information is available in the index, the partition 118 is scanned as efficiently as possible to obtain the row count, which obviously results in slower performance.

The row count is sent to a designated PU 102 that computes the total row count across the system 100. This designated PU 102 then computes how many sample rows are to be obtained from each PU 102. Generally, this is done by allocating the number of sample rows requested from each of the PUs 102 in proportion to how many rows are stored on their associated DSUs 106.

In the preferred embodiment, the allocation of sample rows requested from each PU 102 is determined as follows:

For each PU 102, compute proportional_allocation =fraction* total_row_count, where "fraction" is the fraction of the total rows comprising the sample request and "total_row_count" is the total number of rows stored on the DSU 106 associated with that PU 102.

If more rows than needed (in total) are allocated, then the proportional_allocation for the last PU 102 is reduced.

If there are not enough rows available to a PU 102 to fulfill its proportional_allocation, then the proportional_allocation for the PU 102 is reduced.

If less rows than needed (in total) are allocated, then allocate zero or more additional rows to the proportional_allocations for each PU 102 until the total rows have been allocated.

Note that the above is just one of the many possible algorithms for proportional allocation of rows across the PUs 102. The essence is that allocation is done proportional to the number of rows on the PU 102, and that PU 102 selection is unbiased (i.e., random). Note that PUs 102 are considered in a random order for the purposes of the allocation in the algorithm mentioned.

Once the proportional allocations have been computed, sampling requests are sent to each of the PUs 102, wherein each of the sampling requests comprise the number of sample rows requested. Note that, at this point, the method just needs to know how many rows are needed from the PU 102.

When each PU 102 receives its proportional allocation from the designated PU 102, it then executes the steps necessary to fulfill the sampling request. While the request is not complete, it finds the next "accepted" row, i.e., a row that belongs to the requested sample. This is done by computing the current probabilities of the next row belonging to any of the samples or being rejected. The probability is simply (# rows remaining in the sample request)/(total number of rows remaining). Then, a random "toss" performed by the PU 102 either rejects the row or allocates it to one of the sample request. The "remaining row count" for the sample request (or the rejected row set) is decremented and the steps are repeated.

When an accepted row is found, the PU 102 reads the accepted row, assigns a sample identifier to the accepted row, and then writes the accepted row to the output. The output is the set of sample rows and an optional identifying expression that identifies the sample to which the row belongs. In the case where multiple samples are requested but no identification is requested, the output will still have all the requested sample rows, but there will have no way of identifying which row belongs to which sample.

An appropriate warning is issued if the request can not be satisfied completely.

Logic of the Parallel Sampling Method

Figure 2:
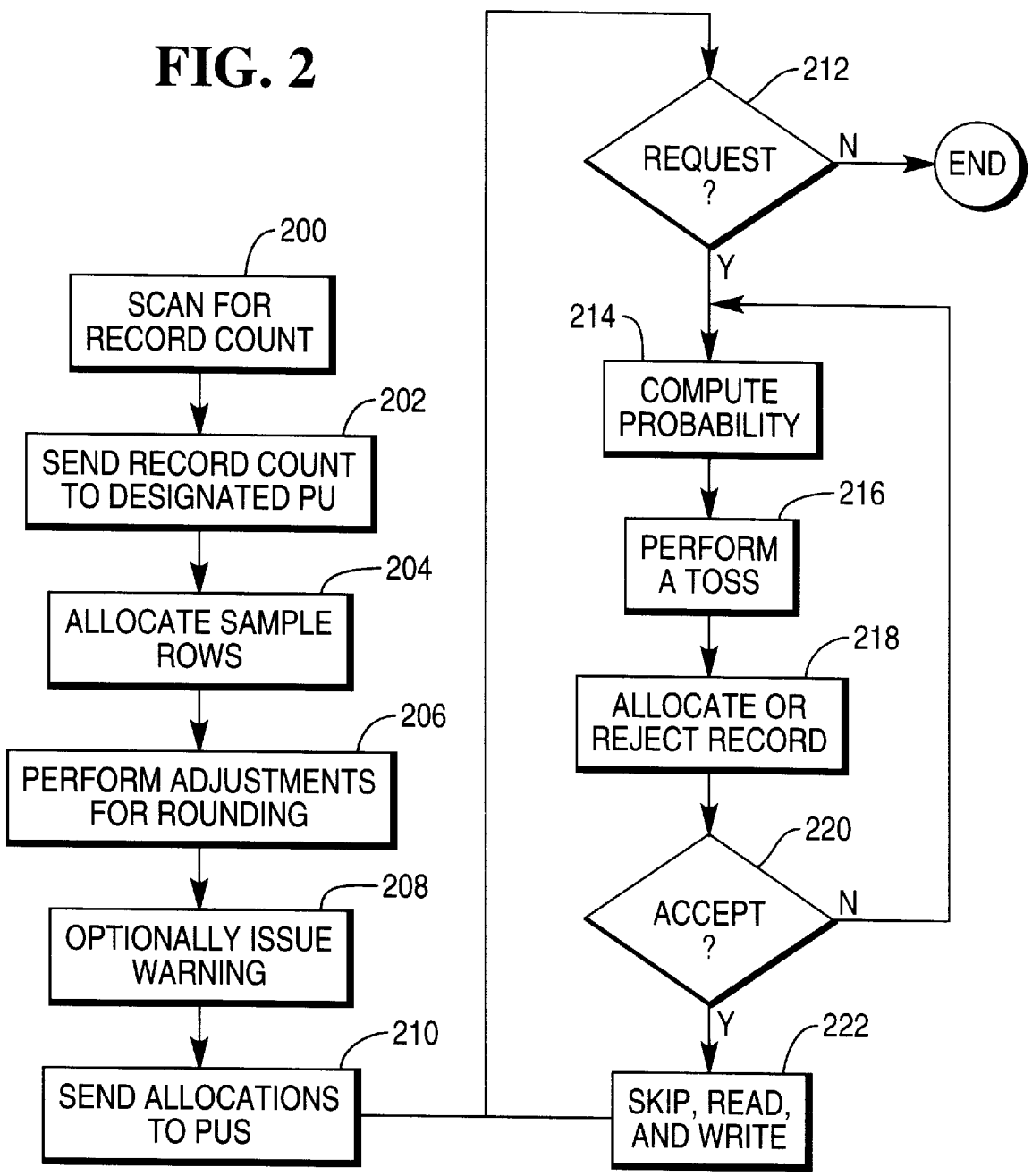
FIG. 2 is a flow chart illustrating the logic performed according to the preferred embodiment of the present invention.

FIG. 2 is a flowchart that illustrates the logic performed according to the preferred embodiment of the present invention. Preferably, the logic of the sampling method would be invoked in a process on each of the PUs 102 whenever a sample request is made to obtain samples of row from the entire table of rows.

In FIG. 2, all steps are performed independently on multiple PUs 102, except steps 204, 206, 208, and 210. Steps 204, 206, 208, and 210 are performed only on one of the PUs 102, known as a designated PU 102.

Block 200 represents the PU 102 scanning the index or partition 118 to obtain a count of rows stored on the DSU 106 and managed by the PU 102.

Block 202 represents the PU 102 sending the row count to the designated PU 102.

Block 204 represents the designated PU 102 allocating sample requests in proportion to the number of rows on each PU 102.

Block 206 represents the designated PU 102 performing adjustments to the sample requests as necessary.

Block 208 represents the designated PU 102 issuing warnings, if the sample request cannot be completely satisfied Block 210 represents the designated PU 102 sending the sample requests, including the proportional allocation, to the PUs 102 for processing.

Block 212 is a decision block that represents the PU 102 determining whether there are any remaining unsatisfied sample requests. If so, then control transfers to Block 214; otherwise, the logic terminates.

Block 214 represents the PU 102 computing the probability of the next row belonging to a sample or being rejected.

Block 216 represents the PU 102 performing a "toss" to determine if the next row belongs to a sample (i.e., is accepted) or is rejected.

Block 218 represents the PU 102 allocating the row to the sample, or rejecting the row, and in either case decrementing the "remaining count" by 1.

Block 220 is a decision block that represents the PU 102 determining whether an accepted row has been found. If so, control transfers to Block 222; otherwise, control transfers to Block 214.

Block 222 represents the PU 102 reading the accepted row, assigning the sample identifier to the accepted row, and then writing out the accepted row. Thereafter, control returns to Block 212.

Conclusion

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, any RDBMS that uses (or wants to use) sampling (SQL-based or otherwise) could benefit from the present invention.

In another alternative embodiment, the partitions of the table need not be spread across separate data storage devices. Instead, the partitions could be stored on one or a few data storage devices simply to minimize the amount of temporary data storage required at each of the step of performing the sampling method.

In yet another alternative embodiment, the steps or logic could be performed by more or fewer processors, rather than the designated and other processors as described above. For example, the steps could be performed simultaneously on a single processor using a multi-tasking operating environment.

In summary, the present invention discloses a method, apparatus, and article of manufacture for random sampling of rows stored in a table, wherein the table has a plurality of partitions. A row count is determined for each of the partitions of the table and a total number of rows in the table is determined from the row count for each of the partitions of the table. A proportional allocation of a sample size is computed for each of the partitions based on the row count and the total number of rows. A sample set of rows of the sample size is retrieved from the table, wherein each of the partitions of the table contributes its proportional allocation of rows to the sample set of rows. Preferably, the computer system is a parallel processing database system, wherein each of its processing units manages a partition of the table, and some of the above steps can be performed in parallel by the processing units.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for random sampling of rows stored in a table in a computer system, wherein the table has a plurality of partitions, the method comprising:

(a) determining a row count for each of the partitions of the table;
(b) determining a total number of rows in the table from the row count for each of the partitions of the table;
(c) computing a proportional allocation of a sample size for each of the partitions based on the row count and the total number of rows; and
(d) retrieving a sample set of rows of the sample size from the table, wherein each of the partitions of the table contributes its proportional allocation of rows to the sample set of rows.

2. The method of claim 1, wherein the computer system has a plurality of processing units, each of the processing units manages a partition of the table, and the determining step (a) and retrieving step (d) are performed in parallel by the processing units.

3. The method of claim 1, wherein the retrieving (d) step further comprises identifying mutually exclusive rows belonging to the sample set of rows.

4. The method of claim 1, wherein the retrieving (d) step further comprises creating the sample set of rows using a stratified random sampling method.

5. The method of claim 1, wherein each partition of the table is stored as a B+ Tree indexed file.

6. The method of claim 5, wherein an index for each partition of the table contains information concerning the row count for the partition.

7. The method of claim 6, wherein the determining step (a) comprises scanning the index to determine the row count for the partition.

8. The method of claim 1, wherein the determining step (a) comprises scanning the partition to determine the row count for the partition.

9. The method of claim 1, wherein the computer system has a plurality of processing units, each of the processing units manages one or more partitions of the table, and the method further comprises computing the proportional allocation for each of the partitions based on a number of tows on a processing unit.

10. The method of claim 9, further comprising computing the proportional allocation for each of the partitions as a fraction of the total number of rows.

11. The method of claim 10, further comprising, if a total of the proportional allocations is greater than the sample size, then reducing the proportional allocations for one or more of the partitions.

12. The method of claim 10, further comprising, if a total of the proportional allocations is less than the sample size, then increasing the proportional allocations for one or more of the partitions.

13. The method of claim 10, further comprising, if the partition cannot satisfy its proportional allocation, then reducing the proportional allocation for the partition.

14. The method of claim 1, wherein the computer system has a plurality of processing units, and each of the processing units manages one or more of the partitions of the table.

15. The method of claim 14, wherein the retrieving step (d) comprises transmitting a sample request to each of the processing units, once the proportional allocations have been computed.

16. The method of claim 15, wherein the sample request includes the proportional allocation for the partition.

17. The method of claim 1, wherein the retrieving step (d) comprises identifying a row, and performing a random "toss" that either accepts or rejects the identified row for the sample set of rows.

18. The method of claim 17, wherein the retrieving step (d) comprises writing the accepted row to an output.

19. The method of claim 18, wherein the output is the sample set of rows.

20. The method of claim 18, further comprising assigning an optional identifier to the accepted row that identifies the accepted row as part of the sample set of rows.

21. The method of claim 20, wherein the output comprises a plurality of sample sets of rows.

22. The method of claim 1, wherein the retrieving step (d) comprises issuing an appropriate warning if the sample set of rows cannot be retrieved completely.

23. An apparatus for random sampling of rows stored in a table, comprising:
(a) a computer system having one or more data storage devices coupled thereto, wherein the data storage devices store at least one table, and the table has a plurality of partitions;
(b) logic, performed by the computer system, for
(1) determining a row count for each of the partitions of the table;
(2) determining a total number of rows in the table from the row count for each of the partitions of the table;
(3) computing a proportional allocation of a sample size for each of the partitions based on the row count and the total number of rows; and
(4) retrieving a sample set of rows of the sample size from the table, wherein each of the partitions of the table contributes its proportional allocation of rows to the sample set of rows.

24. The apparatus of claim 23, wherein the computer system has a plurality of processing units, each of the processing units manages a partition of the table, and the logic for determining (1) and retrieving (4) are performed in parallel by the processing units.

25. The apparatus of claim 23, wherein the logic for retrieving (4) further comprises logic for identifying mutually exclusive rows belonging to the sample set of rows.

26. The apparatus of claim 23, wherein the logic for retrieving (4) further comprises logic for creating the sample set of rows using a stratified random sampling method.

27. The apparatus of claim 23, wherein each partition of the table is stored as a B+ Tree indexed file.

28. The apparatus of claim 27, wherein an index for each partition of the table contains information concerning the row count for the partition.

29. The apparatus of claim 28, wherein the logic for determining (1) comprises scanning the index to determine the row count for the partition.

30. The apparatus of claim 23, wherein the logic for determining (1) comprises logic for scanning the partition to determine the row count for the partition.

31. The apparatus of claim 23, wherein the computer system has a plurality of processing units, each of the processing units manages one or more partitions of the table, and the logic further comprises logic for computing the proportional allocation for each of the partitions based on a number of rows on a processing unit.

32. The apparatus of claim 31, further comprising logic for computing the proportional allocation for each of the partitions as a fraction of the total number of rows.

33. The apparatus of claim 32, further comprising logic for reducing the proportional allocations for one or more of the partitions, if a total of the proportional allocations is greater than the sample size.

34. The apparatus of claim 32, further comprising logic for increasing the proportional allocations for one or more of the partitions, if a total of the proportional allocations is less than the sample size.

35. The apparatus of claim 32, further comprising logic for reducing the proportional allocation for the partition, if the partition cannot satisfy its proportional allocation.

36. The apparatus of claim 23, wherein the computer system has a plurality of processing units, and each of the processing units manages one or more of the partitions of the table.

37. The apparatus of claim 36, wherein the logic for retrieving (4) comprises logic for transmitting a sample request to each of the processing units, once the proportional allocations have been computed.

38. The apparatus of claim 37, wherein the sample request includes the proportional allocation for the partition.

39. The apparatus of claim 23, wherein the logic for retrieving (4) comprises logic for identifying a row, and for performing a random "toss" that either accepts or rejects the identified row for the sample set of rows.

40. The apparatus of claim 39, wherein the logic for retrieving (4) comprises logic for writing the accepted row to an output.

41. The apparatus of claim 40, wherein the output is the sample set of rows.

42. The apparatus of claim 40, further comprising logic for assigning an optional identifier to the accepted row that identifies the accepted row as part of the sample set of rows.

43. The apparatus of claim 42, wherein the output comprises a plurality of sample sets of rows.

44. The apparatus of claim 23, wherein the logic for retrieving (4) comprises logic for issuing an appropriate warning if the sample set of rows cannot be retrieved completely.

45. An article of manufacture embodying logic for random sampling of rows stored in a table, wherein the table has a plurality of partitions, the method comprising:

(a) determining a row count for each of the partitions of the table;

(b) determining a total number of rows in the table from the row count for each of the partitions of the table;

(c) computing a proportional allocation of a sample size for each of the partitions based on the row count and the total number of rows; and (d) retrieving a sample set of rows of the sample size from the table, wherein each of the partitions of the table contributes its proportional allocation of rows to the sample set of rows.

46. The method of claim 45, wherein the computer system has a plurality of processing units, each of the processing units manages a partition of the table, and the determining step (a) and retrieving step (d) are performed in parallel by the processing units.

47. The method of claim 45, wherein the retrieving (d) step further comprises identifying mutually exclusive rows belonging to the sample set of rows.

48. The method of claim 45, wherein the retrieving (d) step further comprises creating the sample set of rows using a stratified random sampling method.

49. The method of claim 45, wherein each partition of the table is stored as a B+ Tree indexed file.

50. The method of claim 49, wherein an index for each partition of the table contains information concerning the row count for the partition.

51. The method of claim 50, wherein the determining step (a) comprises scanning the index to determine the row count for the partition.

52. The method of claim 50, wherein the determining step (a) comprises scanning the partition to determine the row count for the partition.

53. The method of claim 45, wherein the computer system has a plurality of processing units, each of the processing units manages one or more partitions of the table, and the method further comprises computing the proportional allocation for each of the partitions based on a number of rows on a processing unit.

54. The method of claim 53, further comprising computing the proportional allocation for each of die partitions as a fraction of the total number of rows.

55. The method of claim 54, further comprising, if a total of the proportional allocations is greater than the sample size, then reducing the proportional allocations for one or more of the partitions.

56. The method of claim 54, further comprising, if a total of the proportional allocations is less than the sample size, then increasing the proportional allocations for one or more of the partitions.

57. The method of claim 54, further comprising, if the partition cannot satisfy its proportional allocation, then reducing the proportional allocation for the partition.

58. The method of claim 45, wherein the computer system has a plurality of processing units, and each of the processing units manages one or more of the partitions of the table.

59. The method of claim 58, wherein the retrieving step (d) comprises transmitting a sample request to each of the processing units, once the proportional allocations have been computed.

60. The method of claim 59, wherein the sample request includes the proportional allocation for the partition.

61. The method of claim 45, wherein the retrieving step (d) comprises identifying a row, and performing a random "toss" that either accepts or rejects the identified row for the sample set of rows.

62. The method of claim 61, wherein the retrieving step (d) comprises writing the accepted row to an output.

63. The method of claim 62, wherein the output is the sample set of rows.

64. The method of claim 62, further comprising assigning an optional identifier to the accepted row that identifies the accepted row as part of the sample set of rows.

65. The method of claim 64, wherein the output comprises a plurality of sample sets of rows.

66. The method of claim 45, wherein the retrieving step (d) comprises issuing an appropriate warning if the sample set of rows cannot be retrieved completely.

* * * * *

UNITED STATES PATENT AND TRADEMARK OFFICE
CERTIFICATE OF CORRECTION

PATENT NO. : 6,564,221 B1
DATED : May 13, 2003
INVENTOR(S) : Shatdal, A.

It is certified that error appears in the above-identified patent and that said Letters Patent is hereby corrected as shown below:

Column 7,
Line 38, delete "tows" and substitute -- rows --

Column 10,
Line 19, delete "die" and substitute -- the --

Signed and Sealed this

First Day of July, 2003

JAMES E. ROGAN
*Director of the United States Patent and Trademark Office*